C. H. GUARD.
Wheels for Vehicles.

No. 146,250.  Patented Jan. 6, 1874.

Witnesses.
Jacob Behel
E. N. J. Behel

Inventor.
Chauncey Holmes Guard

UNITED STATES PATENT OFFICE.

CHAUNCEY H. GUARD, OF ROCKFORD, ILLINOIS.

IMPROVEMENT IN WHEELS FOR VEHICLES.

Specification forming part of Letters Patent No. 146,250, dated January 6, 1874; application filed March 12, 1873.

*To all whom it may concern:*

Be it known that I, CHAUNCEY H. GUARD, of the city of Rockford, in the county of Winnebago and State of Illinois, have invented certain Improvements in Land-Carriages, of which the following is a specification:

My invention relates to the hubs of wheels for land-carriages, or other purposes, when a wooden hub is employed; and consists in the method of banding, as will more fully hereinafter appear.

Figure 1:
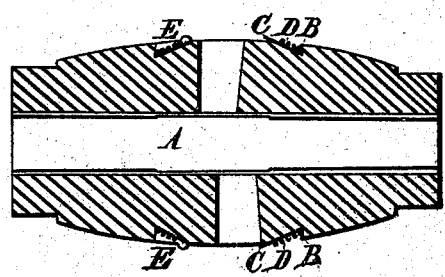
Figure 2:
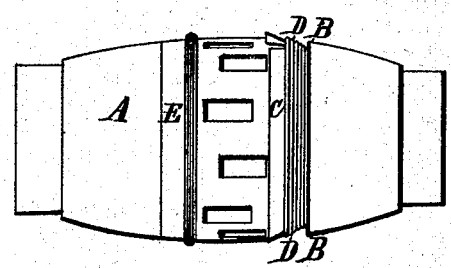

Figure 1 is a longitudinal sectional view of a hub embodying my invention. Fig. 2 is a side view of the same.

In the drawings, A represents a wooden hub of the usual form, the ends of which are fitted to receive bands, and is bored and mortised, as it is usual, to fit wooden hubs. B are V-formed grooves encircling the hub near the ends of the mortises, which are designed to receive the spokes. The walls of these grooves towards the ends of the hub are at right angles to its axis, and the walls of the grooves toward the center of the hub are inclined toward its center at an acute angle to its axis. C is a tin band formed to fit the grooves B, and is made to encircle the hub nearly, leaving sufficient space between its ends to admit of compression without causing its ends to overlap. D is a copper wire, the end of which is soldered or otherwise secured in the acute angle of the tin band on the hub, and is wound around the hub on the tin band, spirally toward its center on the inclined wall of the grooves B, with any force within the capacity of the wire, and when the groove is filled to about the surface of the hub, or within the design of the finish contemplated, the wire is then cut and the free end is soldered or otherwise secured to the tin band or hub. Solder is now employed in such a manner as to unite the tin band and wires in a mass, and to fill the groove to the surface of the hub, or to fill the design of the finish. It may then be finished, as represented at E, or to meet the tastes of the user.

The object of the inclined walls of the annular grooves B is that the bands may overlap the ends of the wood fibers to prevent them from rising or splitting from the force exerted on the sides and ends of the mortises in driving the spokes.

It is not the object of this invention to provide a wooden hub with a metallic band, furnishing a direct metallic support to the spokes of the same, or greater diameter than the diameter of the wooden hub, but to provide a wooden hub, strengthened by metallic bands, that may be finished even with the wooden surface, or in any suitable or ornamental design, and that will resist the force exerted thereon in driving the spokes to prevent splitting or checking the hub.

I have represented my improved hub with V-formed grooves, tin bands wound with copper wire, united with solder and finished, as at E in the drawings; but I do not wish to confine myself to the particular form of grooves, or the material represented, as it is evident that other forms of grooves and other material may be employed without departing from the principle of my invention.

I claim as my invention—

The wooden hub A, having annular grooves B with inner walls inclined toward the center of the hub and near the outer ends of the mortises, and filled with plate bands C, and wires D wound and secured therein, substantially as and for the purpose set forth.

CHAUNCEY HOLMES GUARD.

Witnesses:
 JACOB BEHEL,
 E. N. J. BEHEL.